(12) United States Patent
Pierce et al.

(10) Patent No.: US 6,724,508 B2
(45) Date of Patent: Apr. 20, 2004

(54) INTERNAL REFLECTION APPARATUS AND METHOD USING A HOLOGRAPHIC OPTICAL ELEMENT FOR A FREE SPACE OPTICAL COMMUNICATION SYSTEM

(75) Inventors: Robert Michael Pierce, Woodinville, WA (US); Chace Howard Fadlovich, Edmonds, WA (US); Nicholas Eichhorn Bratt, Edmonds, WA (US)

(73) Assignee: Terabeam Corporation, Kirkland, WA (US)

( * ) Notice: Subject to any disclaimer, the term of this patent is extended or adjusted under 35 U.S.C. 154(b) by 0 days.

(21) Appl. No.: 09/886,246

(22) Filed: Jun. 20, 2001

(65) Prior Publication Data

US 2003/0202227 A1 Oct. 30, 2003

(51) Int. Cl.[7] .................................................. G02B 5/32
(52) U.S. Cl. .............................. 359/15; 359/19; 359/34; 398/87; 398/79; 385/37; 385/24
(58) Field of Search ................................ 359/15, 16, 19, 359/24, 129, 130, 127 T, 34; 385/37, 24

(56) References Cited

U.S. PATENT DOCUMENTS

| 5,295,208 A | 3/1994 | Caulfield |
| 5,465,311 A | 11/1995 | Caulfield |
| 5,515,184 A | 5/1996 | Caulfield |
| 5,682,255 A | * 10/1997 | Friesem et al. ............... 359/15 |
| 5,710,645 A | 1/1998 | Phillips |
| 5,822,089 A | 10/1998 | Phillips |
| 5,854,697 A | 12/1998 | Caulfield |
| 5,974,162 A | 10/1999 | Metz |
| 5,986,746 A | 11/1999 | Metz |
| 6,061,463 A | 5/2000 | Metz |
| 6,151,142 A | 11/2000 | Phillips |
| 2002/0021855 A1 | * 2/2002 | Kim ............................. 385/15 |

* cited by examiner

*Primary Examiner*—Drew Dunn
*Assistant Examiner*—Fayez Assaf
(74) *Attorney, Agent, or Firm*—Blakely Sokoloff Taylor & Zafman LLP (57) ABSTRACT

An apparatus for a free space optical communication system includes an element having a front surface and a back surface. A holographic optical element (HOE) is disposed to receive a light signal from the free space optical communication system, and to angularly direct the light signal, having a certain wavelength, towards one of the surfaces of the element to allow the light signal to propagate between the front and back surfaces of the element via total internal reflection. The internally reflected light signal eventually converges and is received at an optical detector circuit. At the same time, light having other wavelengths, including visible background light, passes through the HOE, thereby giving the apparatus an appearance of being transparent and unobtrusive.

75 Claims, 5 Drawing Sheets

INTERNAL REFLECTION APPARATUS AND METHOD USING A HOLOGRAPHIC OPTICAL ELEMENT FOR A FREE SPACE OPTICAL COMMUNICATION SYSTEM

TECHNICAL FIELD

This disclosure relates generally to wireless communication systems, and in particular but not exclusively, relates to an internal reflection apparatus and method using a holographic optical element (HOE) for a free space optical communication system.

BACKGROUND

With the increasing popularity of wide area networks, such as the Internet and/or World Wide Web, network growth and traffic have exploded in recent years. Network users continue to demand faster networks, and as network demands continue to increase, existing network infrastructures and technologies are reaching their limits.

An alternative to existing hardwire or fiber network solutions is the use of wireless optical communications technology. Wireless optical communications utilize beams of light, such as lasers, as optical communications signals, and therefore do not require the routing of cables or fibers between locations. Data or information is encoded into a beam of light, and then transmitted through free space from an optical transmitter to an optical receiver.

At a basic level, a typical optical receiver is basically a telescope having many components, including associated electronics to demodulate data on the light beam and to perform other processing. Because these optical receivers have many parts, their overall size or "footprint" increases. The individual parts themselves may also have a large footprint. This increased footprint can be detrimental in situations where the units need to be installed in a non-obtrusive manner.

As an example, a problem with most through-the-window optical communication devices, such as optical receivers, is that they tend to take up window space. The larger the collector aperture of an optical receiver, the more light power can be collected, but at the cost of space. The large size of the optical receiver can significantly and undesirably obstruct a window, thereby blocking sunlight or blocking what may otherwise be a beautiful view.

The large size of these optical receivers also makes them heavy. This increased weight thus requires such optical receivers to be firmly and structurally supported, and makes them difficult to install, move, or reposition. The large number of parts of these optical receivers also contributes to their overall cost, including significant manufacturing expenses incurred since the complexity of the optical receivers may preclude cost-effective mass-production techniques.

SUMMARY OF THE INVENTION

According to an aspect of the invention, an apparatus includes an element having a front surface and a back surface. A holographic optical element (HOE) is disposed to angularly direct a light signal towards one of the surfaces of the element to allow the light signal to propagate between the front and back surfaces of the element via internal reflection.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an internal reflection and method apparatus and method that uses a holographic optical element (HOE) are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, an embodiment of the invention provides an apparatus that can be used as part of an optical receiver in a free space optical communication system. The apparatus can be a substantially inconspicuous light collector device for customer premises, where window space is at a premium or otherwise coveted. The apparatus can be lightweight and eye-safe, as well as being large enough to collect sufficient signal light. In contrast to other types of optical receivers, the apparatus according to an embodiment of the invention allows background visible light to pass through, thereby filtering the background visible light from a photodetector that is to receive the signal light.

Thus, an embodiment of the invention provides an apparatus with a sufficiently large aperture that does not consume window space in the same manner as other optical receivers. Visible light transmits through it. An embodiment of the invention allows this passage of visible light, while collecting the desired light signal, via use of a holographic element (HOE) sandwiched between glass plates, for example. The HOE efficiently diffracts near infrared (IR) light (e.g., the light signal for communications), and bends it such that the light signal cannot escape one of the glass plates and instead propagates within that glass plate via total internal reflection. Since visible light diffracts less than IR light, the visible light can escape through the glass plate.

Figure 1:
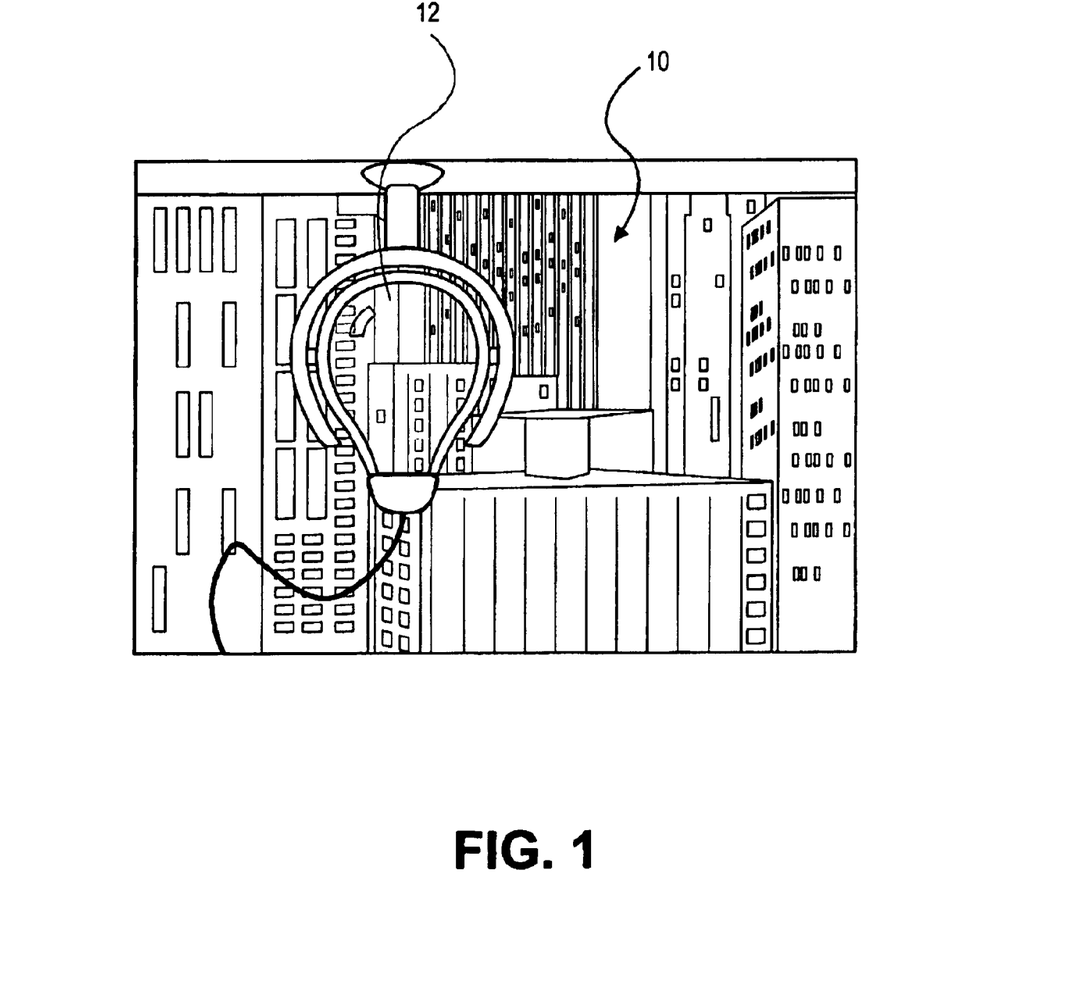
FIG. 1 is a pictorial view illustrating deployment of an apparatus according to an embodiment of the invention.

Referring first to FIG. 1, shown generally at 10 is an apparatus according to an embodiment of the invention. More specifically, FIG. 1 is a pictorial view illustrating deployment of the apparatus 10. The apparatus 10 is mounted near a windowpane 12. As can be seen in FIG. 1, the apparatus 10 is substantially unobtrusive while still having a relatively large light collection area. Furthermore, the apparatus 10 passes visible light, thereby allowing one to view the scene opposite to the windowpane 12 through the apparatus 10.

Figure 2:
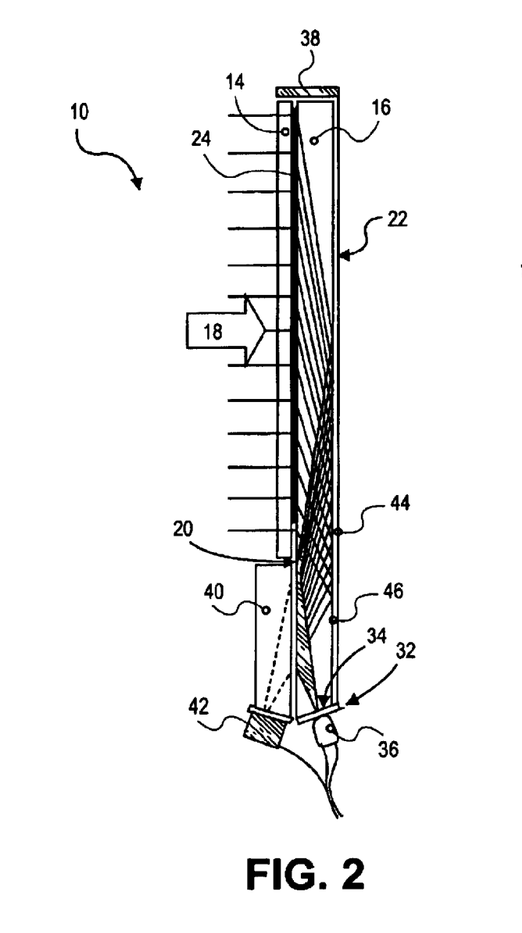
FIG. 2 is a cross-sectional side view of the apparatus of FIG. 1.

FIG. 2 is a cross-sectional side view of the apparatus 10 of FIG. 1. The apparatus 10 comprises a first element 14 and a second element 16. The first element 14 and the second element 16 can be made from a glass material (such as BK-7 glass or other glass, for example), a plastic material, or other transparent material. The first element 14 is positioned to face a light signal 18 (represented in FIG. 1 as a plurality of light rays) from a free space optical communication system. During deployment, such as illustrated in FIG. 1, the first element 14 can be positioned against the windowpane 12 to receive the light signal 18.

The second element 16 has a first surface 20 (e.g., a front surface) positioned adjacent to the first element 14 and has a second surface 22 (e.g., a back surface). A HOE, comprising a holographic material 24 having an interference pattern recorded thereon, is disposed between the first element 14 and the first surface 20 of the second element 16 in one embodiment. In another embodiment, the holographic material 24 can be disposed within the second element 16. In yet another embodiment, the holographic material 24 can be disposed on the second surface 22 of the second element 16.

Figure 3:
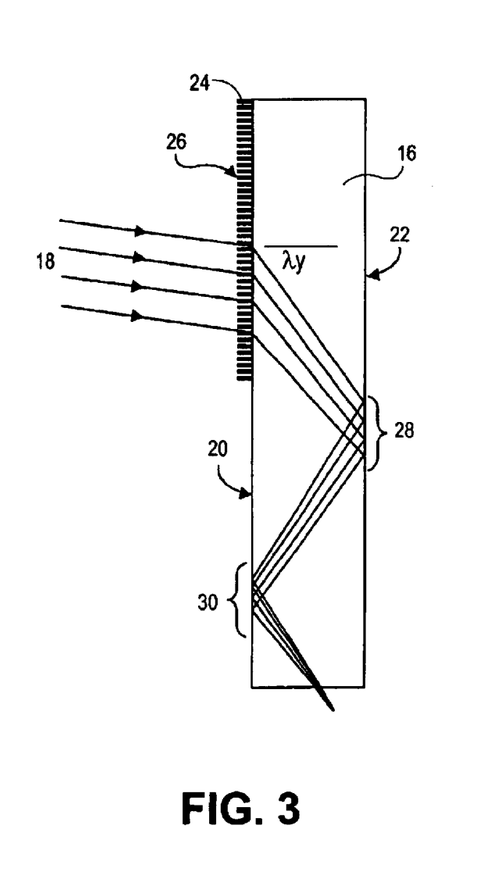
FIG. 3 is a partial cross-sectional side view illustrating operation of the apparatus of FIGS. 1–2 in greater detail.

FIG. 3 is a partial cross-sectional side view illustrating operation of the apparatus 10 of FIGS. 1–2 in greater detail. The light signal 18 passes through the first element 14 and is received by an interference pattern 26 recorded on the holographic material 24. In accordance with an embodiment of the invention, the interference pattern 26 comprises part of a diffraction hologram. The interference pattern 26 is structured to angularly direct or diffract the light signal 18 towards the second surface 22 of the second element 16.

With an appropriate choice of an angle to diffract the light signal 18 towards the second surface 22, the light signal 18 can propagate between the second surface 22 and the first surface 20 via total internal reflection. In accordance with an embodiment of the invention, the rays of the light signal 18 can be directed towards the second surface 22 at angles y of 42 degrees or greater depending upon the value of the "critical angle" for total internal reflection, measured downward from a horizontal plane. This choice for the range of diffraction angles y prevents the rays of the light signal 18 from simply passing through the second element 16 in a horizontal direction, and instead causes them to be internally reflected between the first surface 20 and the second surface 22. The appropriate angle(s) needed to achieve total-internal-reflection, in one embodiment, can be determined by materials used for the second element 16 as well as the material adjacent to the second surface 22.

In embodiments where the holographic material 24 is disposed within the second element 16, the interference pattern 26 can comprise a transmission hologram or a reflection hologram. If in this embodiment the interference pattern 26 comprises a transmission hologram, then the interference pattern 26 diffracts the light signal 18 towards the second surface 22 of the second element 16 at the appropriate critical angle(s) y. If in this embodiment, however, the interference pattern 26 comprises a reflection hologram, then the interference pattern 26 reflects the light signal 18 towards the first surface 20 of the second element 16 at the appropriate critical angle(s) y. Once diffracted or reflected towards the appropriate surface of the second element 16, the light signal 18 can propagate between the first surface 20 and the second surface 22 via total internal reflection.

In embodiments where the holographic material 24 is disposed on the second surface 22 of the second element 16, the interference pattern 26 can comprise a reflection hologram. In such embodiments, the light signal 18 passes through the second element 16 until it reaches the interference pattern 26. Then, the interference pattern 26 is structured to reflect the light signal 18 towards the first surface 20 at the critical angle(s) y. The light signal 18 can subsequently propagate between the first surface 20 and the second surface 22 via total internal reflection.

As shown in FIG. 3 for an embodiment where the holographic material 24 is disposed on the first surface 20 and wherein the interference pattern 26 comprises a diffraction hologram, the light signal 18 is reflected twice (e.g., is "bounced" at a reflection region 28 of the second surface 22 and at a reflection region 30 of the first surface 20). A factor that can influence the number of "bounces" is a thickness of the second element 16. As the thickness of the second element 16 is decreased, the number of reflections increases. Furthermore, it is noted that the rays of the light signal 18 that propagate through the second element 16 (via total internal reflection) are converging, with the convergence capable of being designed and controlled based on the recording process for the HOE. Therefore, as shown at FIG. 2, the light rays of the light signal 18 approach a convergence point 32 near an end surface 34 of the second element 16.

In effect, an embodiment of the apparatus 10 is a dispersive device. Background light coming into the receive aperture of the apparatus 10 (e.g., light incident on the first element 14) gets dispersed as it passes through the apparatus 10, except for the light signal 18 at a certain wavelength that is diffracted by the interference pattern 26. That is, light will substantially pass through the second element 16 unless it is of a certain wavelength range that is designed to be diffracted by the interference pattern 26. The light at certain wavelength(s) that are diffracted and the light at other wavelength(s) that are passed can be designed for or selected during the recording process for the interference pattern 26, as will be described later below.

Referring again to FIG. 2, an optical detector circuit 36 operates to receive the light signal 18 that has been internally reflected through the second element 16. In an embodiment, the optical detector circuit 36 includes a large-core optical fiber (with a core diameter of 1–2 mm, for example) having an end surface area that is positioned at the end surface 34 near the convergence point 32. The surface area of the end of the optical fiber may be aligned approximately 14 degrees from horizontal, for instance, so as to directly face and receive the light rays near the convergence point 32. The optical fiber, in turn, is coupled to light-processing electronics and other components (not shown) that extract the data modulated on the light signal 18. In another embodiment, the optical detector circuit 36 can comprise a photosensitive device, such as a photodiode, phototransistor, PIN detector, avalanche photodiode, charge-coupled device, or other photodetector that is placed near the convergence point 32, thereby reducing or eliminating the need to use the optical fiber.

The apparatus 10 can further include a coating 38 (such as a black coating or other opaque coating) to cover edge surfaces of the second element 16 (e.g., surfaces different from the first surface 20 and the second surface 22). The coating 38 may also cover the edge surfaces of the first element 14. The coating 38 prevents light form entering via the sides/edges of the apparatus 10 and then going into the optical detector circuit 36. In effect, the coating 38 keeps the apparatus 10 "in the dark" except for the light that enters through its aperture.

An embodiment of the apparatus 10 can further include a coupler prism 40 positioned adjacent to the first surface 20 of the second element 16. The coupler prism 40 obtains a portion of the light signal 18 that propagates between the first surface 20 and the second surface 22. For instance, by controlling the amount of spacing between the coupler prism 40 and the first surface 20 of the second element 16 near the reflection region 30 of FIG. 3, a portion of the light signal 18 at the reflection region 30 can be obtained by the coupler prism 40. The amount of light obtained at the reflection region 30 can be increased or attenuated by adjusting the amount of spacing between the coupler prism 40 and the first surface 20.

The coupler prism 40 is coupled to a device that can use the obtained portion of the light signal 18 for auxiliary purposes. For instance, a position detector 42 can be coupled to receive the portion of the light signal from the coupler prism 40, and then provide orientation information based on that obtained portion of the light signal 18. A suitable example of the position detector 42 is a quadrant cell detector that can be used for tracking purposes.

In one embodiment, the coupler prism 40 can be used for automatic gain control purposes or other power/amplitude control of the light signal 18. For instance, the amount of light that reaches the optical detector circuit 36 can be increased by increasing the spacing between the coupler prism 40 and the first surface 20 at the reflection region 30. Conversely, the amount of light that reaches the optical detector 36 can be decreased by decreasing the spacing between the coupler prism 40 and the first surface 20 at the reflection region 30, including substantially preventing any light from reaching the optical detector circuit 36 by making the coupler prism 40 flush (in contact) with the first surface 20.

It is noted that the coupler prism 40 of FIG. 2 is positioned approximately at the lower ¼ of the apparatus 10, where the holographic material 24 ends. The holographic material 24 has a length that is chosen to prevent incidence thereon (e.g., near the reflection region 30) of the light signal 18 that is reflected from the reflection region 28 of the second surface 22. By not having any internally reflected light incident on the interference pattern 26 on the holographic material 24, the light diffracted from the interference pattern 26 is not interfered with.

An embodiment of the apparatus 10 may have a clear film 44 to cover the second surface 22 of the second element 16. The film 44 may be made of a material such as clear plastic. An air space or air gap 46 can separate the film 44 from the second surface 22. The film 44 acts a protection for the second surface 22 from dirt, grime, smudge, and the like that may adversely affect the internally reflected light. The presence of the air gap 46 ensures that the second surface 22 is completely insulated from any of these contaminants that may settle on the film 44, and therefore keeps the second surface 22 clear and undistorted for internal reflection purposes.

Figure 4:
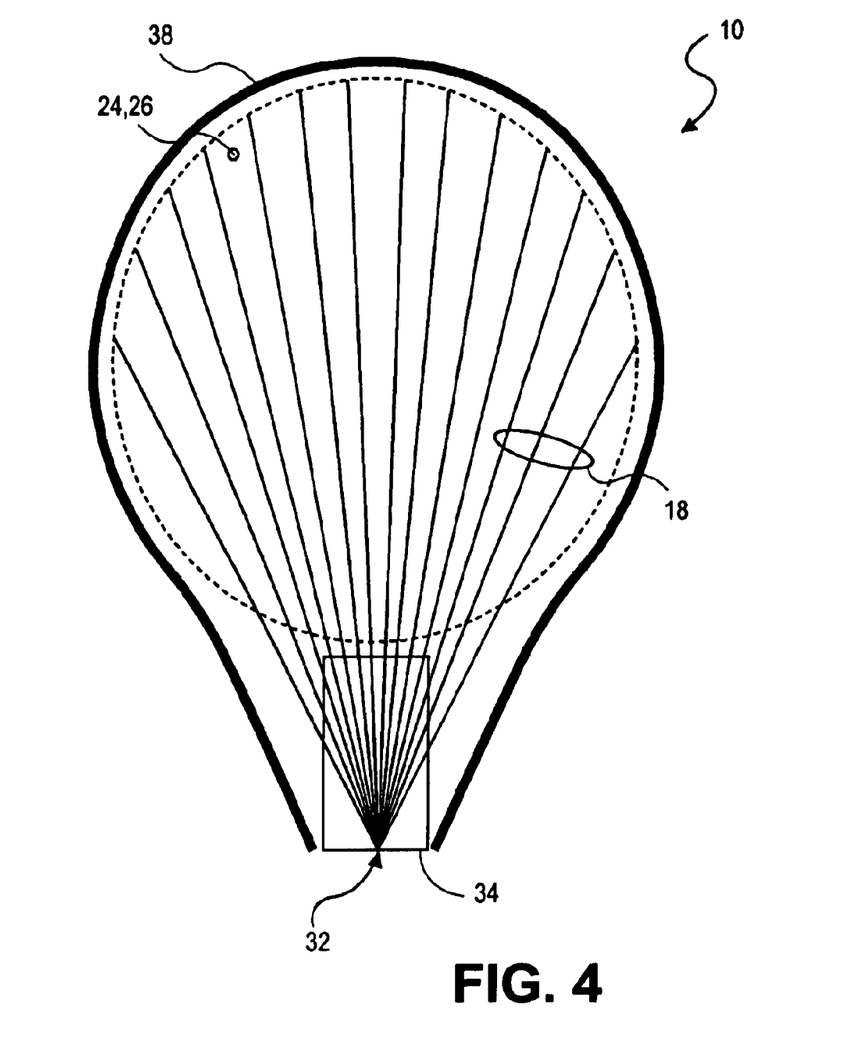
FIG. 4 is a partial front view illustrating operation of the apparatus of FIGS. 1–2.

FIG. 4 is a front view further illustrating operation of an embodiment of the apparatus 10. More specifically, FIG. 4 shows how the interference pattern 26 recorded on the holographic material 24 diffracts the light signal 18. Via internal reflection, the light signal 18 eventually converges at the convergence point 32 near the end surface 34 of the second element 16.

FIG. 4 also illustrates that the apparatus 10 can have an aesthetically attractive shape, such as oval or semi-circular. An example diameter of the aperture of the apparatus 10 can be between 2 and 24 inches, but other sizes for the aperture can be used based on the particular application. It is to be appreciated that the apparatus 10 may have a shape different from what is shown in FIG. 4, and that it may also have apertures having different sizes in other embodiments. The total thickness of the apparatus 10 can be approximately 3 cm to 1 mm, as examples. That is, an embodiment of the apparatus 10 is nearly flat and unobtrusive, thereby making it suitable for window mounting where blinds or curtains may need to be drawn over the apparatus 10. This narrow form factor coupled with the fairly large aperture makes the apparatus 10 lightweight, yet capable of collecting sufficient light without appearing to a person as draining window space.

Figure 5:
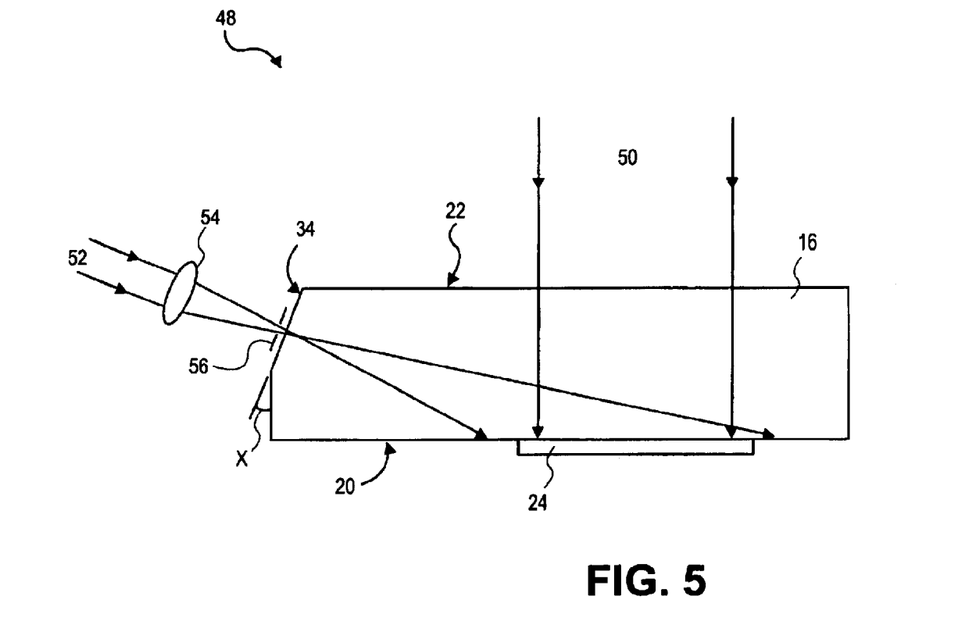
FIG. 5 is a schematic diagram illustrating a recording process for a holographic optical element (HOE) for the apparatus of FIGS. 1–2 according to an embodiment of the invention.

FIG. 5 is a schematic diagram illustrating a recording process 48 for the HOE of the apparatus 10 according to an embodiment of the invention. The recording process 48 can be used to construct the interference pattern 26 as a diffraction grating or diffraction hologram on the holographic material 24. In embodiments where the interference pattern 26 comprises a reflection hologram, a person skilled in the art having the benefit of this disclosure can understand how to record a hologram such that the interference pattern 26 can reflect light signals having suitable critical angles, rather than diffracting the light signals. Therefore, a recording process for a reflection hologram will not be described in further detail herein.

In one embodiment, the construction and playback wavelengths are the same, such as at 488 nm or at 514 nm. It is to be appreciated that these wavelengths are merely illustrative and can range between approximately 350 nm to 850 nm in various other embodiments. Although this "single step" process of recording and playing back at the same wavelength provides the advantage of being simple, it is possible to provide HOEs in an embodiment where the HOE is played back at a wavelength different than the recording wavelength. For instance, the recording wavelength can be at 488 nm and the playback wavelength(s) (e.g., the wavelength of the light signal 18) can be at 785 nm, 850 nm, or 1550 nm. In an embodiment, the light signal 18 for playback can comprise laser light and the like.

Better performance for the HOE can be obtained in one embodiment where the recording and playback wavelengths do not vary by a great percentage. However, the efficiency and the focus of the HOE can nevertheless be optimized where there is great variation between these two wavelengths, such as when the playback wavelength is in the infrared. This is because diffraction efficiency and spot size (e.g., focus) for virtually any type of diffraction grating can be calculated.

As shown in FIG. 5, the recording process 48 first involves application of the holographic material 24 on the front surface 20 of the second element 16 (which is acting as a substrate in the recording process 48). Various types of suitable mixtures can be used for the holographic material 24, including various emulsion materials. In one embodiment, a dichromated gelatin material can be used for the holographic material 24. An example of a suitable type of gelatin, which can be mixed with dichromate according to ratios known by those skilled in the art, is designed by Ralcon Development Lab, located at Paradise City, Utah, and manufactured by Kind & Knox Gelantine, Inc., located at Sioux City, Iowa, under their Gelita™ line of optical gelatins, Type 7644, Lot 2. In another embodiment, a photopolymer material with low shrinkage characteristics and which does not require heating can be used. An example of such a photopolymer material is product number HRF-600X113-6*0.5 GB/TRANS, available from DuPont Holographics, Experimental Station, P.O. Box 80352, Wilmington, Del. 19880-0352. An anti-halation layer (not shown) can be applied over the holographic material 24 prior to commencement of the recording process 48.

Next, two light beams 50 and 52 are directed towards the holographic material 24. The light beam 50 (e.g., a reference beam) is incident perpendicularly to the second surface 22 and passes through the second element 16 towards the holographic material 24. The light beam 52 is first passed through a spatial filter or lens 54 that focuses the light beam 52 towards a pinhole 56. From the pinhole 56, the light beam 52 diverges and is incident on the end surface 34 of the second element 16. As shown in FIG. 5, the end surface 34 can be beveled, such that it has an angle x measured from vertical in one embodiment.

The light beam 52 then passes towards the holographic material 24. Wherever the light beams 50 and 52 overlap on the holographic material 24, their interference at that location on the holographic material 24 is recorded as the interference pattern 26. In some instances, due to the large diffraction angles used in one embodiment of the apparatus 10, diffraction efficiency may be polarization-dependent. Increasing the thickness of the holographic material 24 can ameliorate polarization dependence in near-Bragg match conditions. After the interference pattern 26 is recorded, the anti-halation layer is removed. The first element 14 is glued on or otherwise affixed over the holographic material 24 to seal it.

Figure 6:
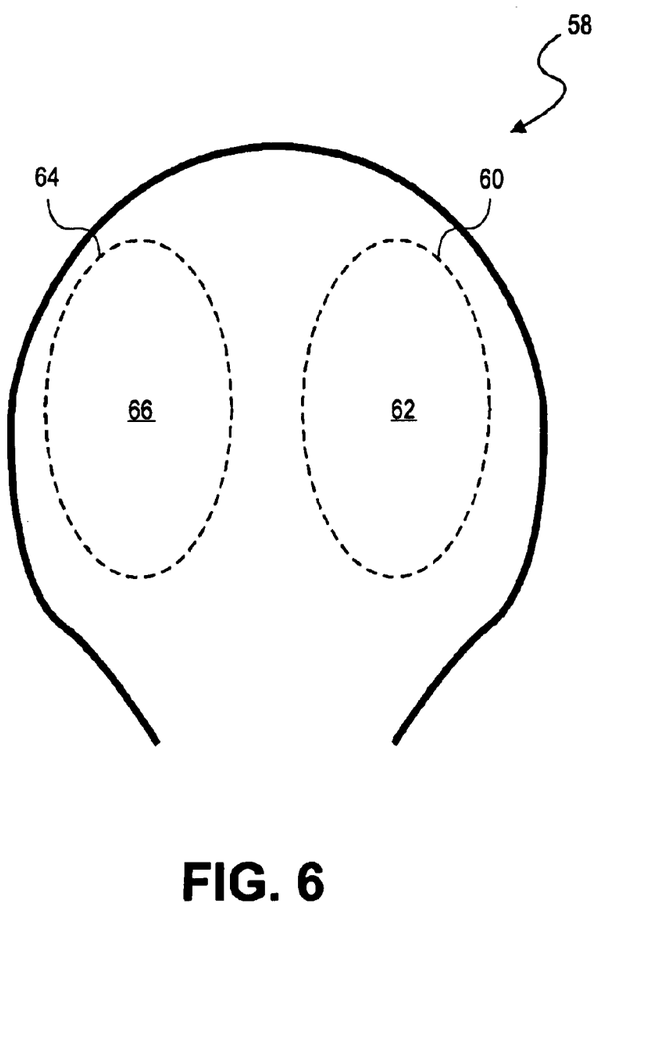
FIG. 6 is a partial front view illustrating an apparatus that can transmit and receive light signals in accordance with an embodiment of the invention.

FIG. 6 is a partial front view illustrating an apparatus 58 that can transmit and receive light signals in accordance with an embodiment of the invention. The apparatus 58 can include similar components as shown and described in the preceding figures and description. Such similar components can include a HOE to receive light signals from the free space optical communication system and to direct the light signal towards one surface of a second element to allow the light signal to propagate through the second element via total internal reflection, a coating along the edge, an optical detector circuit, and the like. A difference between the embodiment shown in FIG. 6 and the other embodiments described above is that the apparatus 58 can perform both transmission and reception.

The apparatus 58 comprises a first holographic material 60 having a first interference pattern 62 recorded thereon, which together comprise a first HOE. This first HOE can be similar in location, structure, configuration, recording process, operation, shape, and other characteristics as that described above for receiving the light signal 18 and directing the received light signal 18 to propagate in a total internal reflective manner for eventual reception by an optical detector circuit.

Positioned adjacent to the first HOE is a second HOE comprising a second holographic material 64 having a second interference pattern 66 recorded thereon. In one embodiment, the second HOE can be placed in a "binocular" manner next to the first HOE as shown in FIG. 6. It is to be appreciated that this positioning is merely illustrative and that the second HOE can be located at other locations on the apparatus 58 relative to the first HOE. The first and second HOEs can be disposed on the same surfaces (e.g., in a planar arrangement), or they may be disposed on different planes (e.g., the first HOE is disposed on a front surface of an element, while the second HOE is disposed on a back surface of that element). Based on the particular placement of the second HOE, its interference pattern 66 may be transmissive or reflective. In accordance with an embodiment of the invention, the second HOE may be substantially similar to the first HOE. That is, the second HOE may be created using similar materials and recording processes as described above.

Operation of the apparatus 58 for transmission purposes may be described in reference to an embodiment of the apparatus 10 of FIG. 2 that has been modified to include the second holographic material 64 and the second interference pattern 66. First, another light signal is sent from a source (such as a laser) located near the end surface 34 of the second element 16. The light signal is directed by the source to one of the surfaces of the second element 16 at suitable critical angle(s) to allow that light signal to propagate between the first surface 20 and the second surface 22 of the second element 16 via total internal reflection. Next, this light signal that has propagated between the surfaces of the second element 16 reaches the second interference pattern 66, and is directed by the second interference pattern 66 to pass through the first element 14 and on to the free space optical communication system.

In an embodiment, the second interference pattern 66 can diffract the light signal through the first element 14, such as if the second holographic material 64 is disposed on the first surface 20 of the second element 16 or within the second element 16. In other embodiments, the second interference pattern 66 can reflect the light signal through the first element 14, such as if the second holographic material 64 is disposed on the second surface 22 of the second element 16 or within the second element 16. According to various embodiments, the received and transmitted light signals can be at different wavelengths, such as 1550 nm for the receive wavelength and 1625 nm for the transmit wavelength.

In conclusion, an embodiment of the apparatus 10 uses a HOE to collect light (e.g., the light signal 18) at a certain wavelength, while substantially passing other light having other wavelengths, including background light. The light signal 18 is diffracted by the HOE, and via total internal reflection, is angularly directed to eventually reach the optical detector circuit 36. The aperture size of the apparatus 10 can be increased without appearing to drain window space, since visible light is passed through. The larger aperture size is better than a smaller aperture size, since in addition to being able to collect more light, eye safety, scintillation, and the like can be compensated for.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, while a semi-circular shape for the apparatus 10 is shown in FIGS. 1 and 4, other embodiments can have other shapes, based on factors such as ornamental design, available window space, shape of the windowpane 12, amount of light desired to be collected, and the like. Furthermore, while the prism coupler 40 (made of glass or plastic, for example) and the position detector 42 are described herein as capable of being used for tracking purposes, it is to be appreciated that other embodiments of the apparatus 10 need not require tracking. As such for these embodiments, the prism coupler 40 and/or the optical detector 42 need not be installed or used.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A system, comprising:
   an element having a front surface and a back surface;
   a holographic optical element (HOE) disposed to angularly direct a light signal, having data modulated thereon and received from a free space optical communication system, towards one of the surfaces of the element to allow the light signal to propagate between the front and back surfaces of the element via internal reflection; and
   an optical detector circuit coupled to the element to receive the light signal that propagates between the front and back surfaces of the element and to generate an electric signal representative of the received light signal having data modulated thereon, wherein the optical detector circuit comprises a photodetector positioned near a surface of the element different from the front and back surfaces.

2. The system of claim 1 wherein the optical detector circuit includes an optical fiber coupled to a surface of the element different from the front and back surfaces.

3. The system of claim 1 wherein the light signal has a certain wavelength, the HOE being structured to angularly diffract the light signal having that wavelength towards the back surface, while substantially passing other light having other wavelengths, including background light, through the element.

4. The system of claim 1 wherein the HOE comprises a holographic material having an interference pattern recorded thereon to reflect the light signal towards the front surface of the element.

5. The system of claim 1, further comprising:
   a coupler prism positioned adjacent to the one of the surfaces of the element to obtain a portion of the light signal that propagates between the front and back surfaces of the element; and
   a position detector coupled to the coupler prism to provide orientation information based on the portion of the light signal obtained by the coupler prism.

6. The system of claim 1, further comprising a coupler prism positioned adjacent to the front surface of the element to obtain a portion of the light signal that propagates between the front and back surfaces of the element, wherein a space between the coupler prism and the front surface is adjustable to control an amount of the light signal that reaches the optical detector circuit.

7. An apparatus, comprising:
   a first element through which to pass a light signal from a free space optical communication system;
   a second element having a first surface positioned adjacent to the first element and having a second surface;
   a holographic material having an interference pattern recorded thereon to receive the light signal passed through the first element, the interference pattern being structured to direct the light signal towards one of the surfaces of the second element to allow the light signal to propagate between the first and second surfaces of the second element via internal reflection; and
   an optical detector circuit coupled to the second element to receive the light signal that propagates between the first and second surfaces of the second element via internal reflection, wherein the optical detector circuit comprises an optical fiber that is positioned at an end surface of the second element different from the first and second surfaces.

8. The apparatus of claim 7 wherein the interference pattern recorded on the holographic material comprises part of a transmission hologram.

9. The apparatus of claim 7 wherein the holographic material is disposed between the first element and the first surface of the second element, and wherein the interference pattern is structured to diffract the light signal towards the second surface of the second element.

10. The apparatus of claim 7 wherein the optical detector circuit comprises a photodetector that is positioned near a surface of the second element different from the first and second surfaces.

11. The apparatus of claim 7, further comprising:
    a coupler prism positioned adjacent to the first surface of the second element to obtain a portion of the light signal that propagates between the first and second surfaces of the second element; and
    a position detector coupled to the coupler prism to provide orientation information based on the portion of the light signal obtained by the coupler prism.

12. The apparatus of claim 7, further comprising a coupler prism positioned adjacent to the first surface of the second element to obtain a portion of the light signal that propagates between the first and second surfaces of the second element, wherein a space between the coupler prism and the first surface is adjustable to control an amount of the light signal that reaches the optical detector circuit.

13. The apparatus of claim 7, further comprising a black coating to cover surfaces of the second element different from the first and second surfaces, and to cover surfaces of the first element different from surfaces that pass the light signal.

14. The apparatus of claim 7 wherein the holographic material has a length chosen to prevent incidence thereon of the light signal reflected from the second surface of the second element.

15. The apparatus of claim 7 wherein the light signal has a near-infrared wavelength, the interference pattern being structured to angularly diffract the light signal having that wavelength while substantially passing other light having other wavelengths, including background light, through the second element.

16. The apparatus of claim 7, further comprising another holographic material having another interference pattern recorded thereon to direct another light signal, which has propagated between the first and second surfaces of the second element, to pass through the first element and on to the free space optical communication system.

17. The apparatus of claim 16 wherein the light signal from the free space optical communication system and the another light signal directed by the another interference pattern on to the free space optical communication system have different wavelengths.

18. An apparatus, comprising:
a first element through which to pass a light signal from a free space optical communication system;
a second element having a first surface positioned adjacent to the first element and having a second surface;
a holographic material having an interference pattern recorded thereon to receive the light signal passed through the first element, the interference pattern being structured to direct the light signal towards one of the surfaces of the second element to allow the light signal to propagate between the first and second surfaces of the second element via internal reflection; and
an optical detector circuit coupled to the second element to receive the light signal that propagates between the first and second surfaces of the second element via internal reflection wherein the optical detector circuit comprises a photodetector that is positioned near a surface of the second element different from the first and second surfaces.

19. The apparatus of claim 18 wherein the interference pattern recorded on the holographic material comprises part of a transmission hologram.

20. The apparatus of claim 18 wherein the holographic material is disposed between the first element and the first surface of the second element, and wherein the interference pattern is structured to diffract the light signal towards the second surface of the second element.

21. The apparatus of claims 18, further comprising:
a coupler prism positioned adjacent to the first surface of the second element to obtain a portion of the light signal that propagates between the first and second surfaces of the second element; and
a position detector coupled to the coupler prism to provide orientation information based on the portion of the light signal obtained by the coupler prism.

22. The apparatus of claim 18, further comprising a coupler prism positioned adjacent to the first surface of the second element to obtain a portion of the light signal that propagates between the first and second surfaces of the second element, wherein a space between the coupler prism and the first surface is adjustable to control an amount of the light signal that reaches the optical detector circuit.

23. The apparatus of claim 18, further comprising a black coating to cover surfaces of the second element different from the first and second surfaces, and to cover surfaces of the first element different from surfaces that pass the light signal.

24. The apparatus of claim 18 wherein the holographic material has a length chosen to prevent incidence thereon of the light signal reflected from the second surface of the second element.

25. The apparatus of claim 18 wherein the light signal has a near-infrared wavelength, the interference pattern being structured to angularly diffract the light signal having that wavelength while substantially passing other light having other wavelengths, including background light, through the second element.

26. The apparatus of claim 18, further comprising another holographic material having another interference pattern recorded thereon to direct another light signal, which has propagated between the first and second surfaces of the second element, to pass through the first element and on to the free space optical communication system.

27. The apparatus of claim 26 wherein the light signal from the free space optical communication system and the another light signal directed by the another interference pattern on to the free space optical communication system have different wavelengths.

28. An apparatus, comprising:
a first element through which to pass a light signal from a free space optical communication system;
a second element having a first surface positioned adjacent to the first element and having a second surface;
a holographic material having an interference pattern recorded thereon to receive the light signal passed through the first element, the interference pattern being structured to direct the light signal towards one of the surfaces of the second element to allow the light signal to propagate between the first and second surfaces of the second element via internal reflection;
a coupler prism positioned adjacent to the first surface of the second element to obtain a portion of the light signal that propagates between the first and second surfaces of the second element; and
a position detector coupled to the coupler prism to provide orientation information based on the portion of the light signal obtained by the coupler prism.

29. The apparatus of claim 28 wherein the interference pattern recorded on the holographic material comprises part of a transmission hologram.

30. The apparatus of claim 28 wherein the holographic material is disposed between the first element and the first surface of the second element, and wherein the interference pattern is structured to diffract the light signal towards the second surface of the second element.

31. The apparatus of claim 28, further comprising an optical detector circuit coupled to the second element to receive the light signal that propagates between the first and second surfaces of the second element via internal reflection.

32. The apparatus of claim 28 wherein the optical detector circuit comprises an optical fiber that is positioned at an end surface of the second element different from the first and second surfaces.

33. The apparatus of claim 28 wherein the optical detector circuit comprises a photodetector that is positioned near a surface of the second element different from the first and second surfaces.

34. The apparatus of claim 28 wherein a space between the coupler prism and the first surface is adjustable to control an amount of the light signal that reaches the optical detector circuit.

35. The apparatus of claim 28, further comprising a black coating to cover surfaces of the second element different from the first and second surfaces, and to cover surfaces of the first element different from surfaces that pass the light signal.

36. The apparatus of claim 28 wherein the holographic material has a length chosen to prevent incidence thereon of the light signal reflected from the second surface of the second element.

37. The apparatus of claim 28 wherein the light signal has a near-infrared wavelength, the interference pattern being structured to angularly diffract the light signal having that wavelength while substantially passing other light having other wavelengths, including background light, through the second element.

38. The apparatus of claim 28, further comprising another holographic material having another interference pattern recorded thereon to direct another light signal, which has propagated between the first and second surfaces of the second element, to pass through the first element and on to the free space optical communication system.

39. The apparatus of claim 38 wherein the light signal from the free space optical communication system and the another light signal directed by the another interference pattern on to the free space optical communication system have different wavelengths.

40. An apparatus, comprising:
a first element through which to pass a light signal from a free space optical communication system;
a second element having a first surface positioned adjacent to the first element and having a second surface;
a holographic material having an interference pattern recorded thereon to receive the light signal passed through the first element, the interference pattern being structured to direct the light signal towards one of the surfaces of the second element to allow the light signal to propagate between the first and second surfaces of the second element via internal reflection;
an optical detector circuit coupled to the second element to receive the light signal that propagates between the first and second surfaces of the second element via internal reflection; and
a coupler prism positioned adjacent to the first surface of the second element to obtain a portion of the light signal that propagates between the first and second surfaces of the second element, wherein a space between the coupler prism and the first surface is adjustable to control an amount of the light signal that reaches the optical detector circuit.

41. The apparatus of claim 40 wherein the interference pattern recorded on the holographic material comprises part of a transmission hologram.

42. The apparatus of claim 40 wherein the holographic material is disposed between the first element and the first surface of the second element, and wherein the interference pattern is structured to diffract the light signal towards the second surface of the second element.

43. The apparatus of claim 40 wherein the optical detector circuit comprises an optical fiber that is positioned at an end surface of the second element different from the first and second surfaces.

44. The apparatus of claim 40 wherein the optical detector circuit comprises a photodetector that is positioned near a surface of the second element different from the first and second surfaces.

45. The apparatus of claim 40, further comprising a position detector coupled to the coupler prism to provide orientation information based on the portion of the light signal obtained by the coupler prism.

46. The apparatus of claim 40, further comprising a black coating to cover surfaces of the second element different from the first and second surfaces, and to cover surfaces of the first element different from surfaces that pass the light signal.

47. The apparatus of claim 40 wherein the holographic material has a length chosen to prevent incidence thereon of the light signal reflected from the second surface of the second element.

48. The apparatus of claim 40 wherein the light signal has a near-infrared wavelength, the interference pattern being structured to angularly diffract the light signal having that wavelength while substantially passing other light having other wavelengths, including background light, through the second element.

49. The apparatus of claim 40, further comprising another holographic material having another interference pattern recorded thereon to direct another light signal, which has propagated between the first and second surfaces of the second element, to pass through the first element and on to the free space optical communication system.

50. The apparatus of claim 49 wherein the light signal from the free space optical communication system and the another light signal directed by the another interference pattern on to the free space optical communication system have different wavelengths.

51. An apparatus, comprising:
an element having a front surface and a back surface;
a holographic optical element (HOE) disposed to angularly direct the light signal towards one of the surfaces of the element to allow the light signal to propagate between the front and back surfaces of the element via internal reflection;
an optical detector circuit coupled to the element to receive, near a convergence point, the light signal that propagates between the front and back surfaces of the element; and
a coupler prism positioned adjacent to the front surface of the element to obtain a portion of the light signal that propagates between the front and back surfaces of the element, wherein a space between the coupler prism and the front surface is adjustable to control an amount of the light signal that reaches the optical detector circuit.

52. The apparatus of claim 51, further comprising another element disposed over the HOE and through which to pass the light signal from a free space optical communication system to the HOE.

53. The apparatus of claim 51 wherein the HOE comprises a holographic material having an interference pattern recorded thereon to diffract the light signal towards the back surface of the element.

54. The apparatus of claim 51 wherein the HOE comprises a holographic material, having an interference pattern recorded thereon, positioned on the front surface of the element.

55. The apparatus of claim 51, further comprising a position detector coupled to the coupler prism to provide orientation information based on the portion of the light signal obtained by the coupler prism.

56. The apparatus of claim 51 wherein the light signal has a certain wavelength, the HOE being structured to diffract the light signal having that wavelength while substantially passing other light having other wavelengths, including background light, through the second element.

57. The apparatus of claim 51, further comprising a coating to cover surfaces of the element different from the front and back surfaces.

58. The apparatus of claim 51 wherein the HOE has a length chosen to prevent incidence thereon of the light signal reflected from the back surface of the element.

59. An apparatus, comprising:
an element having a front surface and a back surface;
a holographic optical element (HOE) disposed to angularly direct the light signal towards one of the surfaces of the element to allow the light signal to propagate between the front and back surfaces of the element via internal reflection;
a coupler prism positioned adjacent to the one of the surfaces of the element to obtain a portion of the light signal that propagates between the front and back surfaces of the element; and
a position detector coupled to the coupler prism to provide orientation information based on the portion of the light signal obtained by the coupler prism.

60. The apparatus of claim 59, further comprising another element disposed over the HOE and through which to pass the light signal from a free space optical communication system to the HOE.

61. The apparatus of claim 59 wherein the HOE comprises a holographic material having an interference pattern recorded thereon to diffract the light signal towards the back surface of the element.

62. The apparatus of claim 59 wherein the HOE comprises a holographic material, having an interference pattern recorded thereon, positioned on the front surface of the element.

63. The apparatus of claim 59, further comprising an optical detector circuit coupled to the element to receive, near a convergence point, the light signal that propagates between the front and back surfaces of the element.

64. The apparatus of claim 59 wherein a space between the coupler prism and the front surface is adjustable to control an amount of the light signal that reaches the optical detector circuit.

65. The apparatus of claim 59 wherein the light signal has a certain wavelength, the HOE being structured to diffract the light signal having that wavelength while substantially passing other light having other wavelengths, including background light, through the second element.

66. The apparatus of claim 59, further comprising a coating to cover surfaces of the element different from the front and back surfaces.

67. The apparatus of claim 59 wherein the HOE has a length chosen to prevent incidence thereon of the light signal reflected from the back surface of the element.

68. A method, comprising:

receiving a light signal from a free space optical communication system; and via use of a holographic optical element (HOE), angularly directing the light signal towards either a front surface or a back surface of an element to allow the light signal to propagate between the front and back surfaces via internal reflection; and controlling an amount of the light signal that reaches an optical detector circuit by changing a spacing between a coupler prism and a region of one of the surfaces of the element that internally reflect light signal.

69. The method of claim 68, further comprising:

obtaining a portion of the light signal from one of the surfaces of the element; and providing orientation information based on that obtained portion of the light signal.

70. The method of claim 68 wherein directing the light signal includes using an interference pattern of the HOE to diffract the light signal towards the back surface of the element.

71. The method of claim 68, further comprising receiving, near a convergence point, the light signal that propagates through the element via internal reflection.

72. The method of claim 68 wherein angularly directing the light signal includes angularly diffracting the light signal having a certain wavelength towards the back surface of the element, while substantially passing other light having other wavelengths, including background light, through the element.

73. The method of claim 68, further comprising recording an interference pattern comprising part of the HOE via use of two interfering light wavefronts incident on a holographic material.

74. The method of claim 68, further comprising separating the back surface of the element from a film with an air gap.

75. The method of claim 68, further comprising via use of another HOE, directing another light signal, which has propagated between the front and back surfaces of the element, towards the free space optical communication system.

* * * * *